United States Patent
Ardö

(10) Patent No.: US 10,091,425 B2
(45) Date of Patent: Oct. 2, 2018

(54) MECHANISM AND A METHOD FOR OPTICAL IMAGE STABILIZATION FOR A CAMERA THAT MOVES AN ELEMENT TO COUNTERACT MOTION OF THE CAMERA

(71) Applicant: Axis AB, Lund (SE)

(72) Inventor: Björn Ardö, Lund (SE)

(73) Assignee: Axis AB, Lund (SE)

( * ) Notice: Subject to any disclaimer, the term of this patent is extended or adjusted under 35 U.S.C. 154(b) by 26 days.

(21) Appl. No.: 15/171,496

(22) Filed: Jun. 2, 2016

(65) Prior Publication Data
US 2016/0360113 A1 Dec. 8, 2016

(30) Foreign Application Priority Data
Jun. 3, 2015 (EP) ..................... 15170472

(51) Int. Cl.
*H04N 5/232* (2006.01)
*G02B 27/64* (2006.01)

(52) U.S. Cl.
CPC ....... *H04N 5/23287* (2013.01); *G02B 27/646* (2013.01); *H04N 5/2328* (2013.01); *H04N 5/23258* (2013.01); *H04N 5/23296* (2013.01)

(58) Field of Classification Search
CPC ............. H04N 5/23258; H04N 5/2251; H04N 5/2252; H04N 5/2254; H04N 5/23238; H04N 5/23287; H04N 5/247; H04N 5/2328; H04N 5/23296; G02B 27/646
See application file for complete search history.

(56) References Cited

U.S. PATENT DOCUMENTS

| | | | | |
|---|---|---|---|---|
| 6,992,700 | B1 * | 1/2006 | Sato | G03B 5/00 348/208.11 |
| 7,978,222 | B2 * | 7/2011 | Schneider | G03B 17/00 348/208.1 |
| 8,442,392 | B2 * | 5/2013 | Ollila | G03B 3/10 310/12.14 |
| 9,049,375 | B2 * | 6/2015 | Wade | G03B 5/00 |
| 9,055,208 | B2 * | 6/2015 | Kim | H04N 5/2254 |

(Continued)

FOREIGN PATENT DOCUMENTS

EP 1 795 957 A1 6/2007

OTHER PUBLICATIONS

EP 15 17 0472.3 European Search Report (dated Aug. 14, 2015).

*Primary Examiner* — Nicholas G Giles
(74) *Attorney, Agent, or Firm* — Volpe and Koenig, P.C.

(57) ABSTRACT

An image stabilization mechanism for a camera is provided. The mechanism comprises a movement sensor capable of sensing motion of the camera, an element in an optical path of the camera, a ball and a plate acting as a bearing allowing for the element to move in a plane orthogonal to the optical path, an actuator mechanism capable of moving the element in the plane, and a processor configured to control the actuator to move the element as a response to motion of the camera as detected by the movement sensor, thereby stabilizing images from the camera. Furthermore, the processor further is configured to move the element along a secondary motion path so as to distribute wear on the plate created by the ball, and the processor is further capable of compensating for an image shift created by the secondary motion path by other means for shifting the image.

15 Claims, 3 Drawing Sheets

(56) References Cited

U.S. PATENT DOCUMENTS

| | | | |
|---|---|---|---|
| 9,185,296 B2 * | 11/2015 | Wade | G03B 5/00 |
| 9,332,188 B2 * | 5/2016 | Takei | G03B 5/00 |
| 2006/0061660 A1 * | 3/2006 | Brackmann | H04N 5/2253 348/208.1 |
| 2006/0098267 A1 * | 5/2006 | Togawa | G02B 26/0816 359/291 |
| 2008/0029708 A1 * | 2/2008 | Olsen | G02B 7/04 250/372 |
| 2008/0231955 A1 | 9/2008 | Otsuka | |
| 2009/0219402 A1 * | 9/2009 | Schneider | G03B 17/00 348/208.7 |
| 2010/0202766 A1 * | 8/2010 | Takizawa | G03B 5/00 396/55 |
| 2011/0150442 A1 * | 6/2011 | Ollila | G03B 3/10 396/55 |
| 2011/0262122 A1 * | 10/2011 | Minamisawa | G03B 5/00 396/55 |
| 2012/0044368 A1 * | 2/2012 | Lin | G02B 27/646 348/208.2 |
| 2012/0293671 A1 | 11/2012 | Chan et al. | |
| 2013/0076924 A1 * | 3/2013 | Wade | G03B 5/02 348/208.11 |
| 2013/0077945 A1 * | 3/2013 | Liu | G02B 26/0841 396/55 |
| 2013/0100304 A1 * | 4/2013 | Wade | G03B 5/00 348/208.4 |
| 2013/0182325 A1 * | 7/2013 | Minamisawa | G03B 5/00 359/554 |
| 2014/0009631 A1 * | 1/2014 | Topliss | G02B 27/646 348/208.11 |
| 2014/0111650 A1 * | 4/2014 | Georgiev | G06T 3/4038 348/159 |
| 2014/0139693 A1 * | 5/2014 | Takei | G03B 5/00 348/208.11 |
| 2015/0043076 A1 * | 2/2015 | Nakayama | G02B 27/646 359/557 |
| 2015/0085363 A1 * | 3/2015 | Liu | G02B 26/0841 359/554 |
| 2015/0201128 A1 * | 7/2015 | Dong | H04N 5/23287 348/208.11 |
| 2015/0370040 A1 * | 12/2015 | Georgiev | G02B 13/007 348/218.1 |
| 2016/0127646 A1 * | 5/2016 | Osborne | H04N 5/2251 348/208.2 |

* cited by examiner

MECHANISM AND A METHOD FOR OPTICAL IMAGE STABILIZATION FOR A CAMERA THAT MOVES AN ELEMENT TO COUNTERACT MOTION OF THE CAMERA

FIELD OF INVENTION

A mechanism for optical image stabilization as well as to a method for optical image stabilization is disclosed.

BACKGROUND

Within the area of still and motion picture cameras image stabilization has always been an issue. Within the context of the present application image stabilization may refer to the reduction of the effects of motion during an exposure time, i.e. a motion that would otherwise result in a motion blur. It should be noted that the effects of the motion may depend on the type of shutter. In a motion picture application, such as when a video camera is used, each individual image may be quite sharp, though due to unwanted motion the recorded video sequence as such may be difficult to follow. A typical "unwanted motion" may in such a case be caused by shaking or vibration, and this may be handled as well within the context of the present application. This type of motion often requires a more complex approach since there may be both an unwanted motion and an intended motion, e.g. a panning motion. In these situations a digital image stabilization may be applied as the only measure or as an additional measure to an optical image stabilization.

The present disclosure will relate to an optical image stabilization mechanism, i.e. a technique in which a component in an optical path of the camera is moved in order to compensate for the unwanted motion. The component moved may typically be a lens element or an image sensor.

It is known to suspend optical components resiliently and controllably, wherein ball bearings supported by a plate (generally one plate per ball) enables a free motion in a plane, see e.g. US 20120027391. As discussed in the cited document the plate and ball construction may be susceptible to wear over time, either affecting the shape of the ball or the surface of the plate, both affecting the performance of the image stabilization. A solution disclosed in the cited document is to form the balls from a ceramic material.

SUMMARY

In an effort to eliminate or at least alleviate some of the drawbacks of prior art the present disclosure relates to an improved mechanism for optical image stabilization. The present image stabilization mechanism for a camera comprises: a movement sensor capable of sensing motion of the camera, an element in an optical path of the camera, a ball and a plate acting as a bearing allowing for the element to move in a plane orthogonal to the optical path, an actuator mechanism capable of moving the element in the plane, a processor configured to control the actuator to move the element as a response to motion of the camera as detected by the movement sensor, thereby stabilizing images from the camera. The stabilization mechanism is characterized in that the processor further being configured to move the element along a secondary motion path so as to distribute wear on the plate created by the ball. Such a secondary motion path may induce an image shift, and therefore the processor is capable of compensating for an image shift created by the secondary motion path by other means for shifting the image.

An inventive stabilization mechanism will provide an improved resistance to wear.

In one or more embodiments the element in the optical path may be a lens or an image sensor. Nothing in the present disclosure disqualifies other elements from being moved, but the lens or the image sensor are the most likely elements from a functional standpoint. The lens may be a single lens a lens assembly, or any other lens element.

In one or several embodiments the secondary motion path may be a continuous motion path, an intermittent motion path, or a combination of thereof.

A speed of motion of the motion along the secondary motion path may in any embodiment be limited so as to result in a shift in the field of view of the camera smaller than a fraction of a pixel of the image sensor per frame, enabling elimination of motion blur by simple means.

In one or more embodiments the processor may configured to use a current motion of the camera as input for the secondary motion path. This will be exemplified in the detailed description in connection to how an amplitude of the camera motion in some embodiments could affect the secondary motion path, yet other parameters could be used instead or as well.

As a combinatory function to other control approaches or as a standalone control of the secondary motion the processor may be configured to use a heat map of a motion of the ball as an input for the secondary motion path. This would correspond to a statistical approach of reducing the wear. This approach has a potential advantage in that it accounts for the actual motion of the ball, rather than a prediction thereof.

The image may be in one or several embodiments be shifted using digital cropping and scaling. This could correspond to a digital image stabilization, and it will be exemplified further in the detailed description. The reference to the detailed description should not be interpreted as a suggestion to limit the usability of the present embodiment to the exact embodiment presented in the detailed description, merely as a reference to a further explanation.

In another embodiment the expected image shift could be eliminated fully or partly by moving a pan and tilt mechanism of the camera. One could foresee a combined embodiment where a pan and tilt mechanism is used alongside a digital image stabilization, e.g. the pan and tilt mechanism could account for the larger shifts, while the digital image stabilization accounts for any residual shift. Since digital image stabilization may be applied anyhow this may not necessarily result in any further complications.

In one or more embodiments the processor may arranged to use optical zooming, scaling and cropping to increase a stabilization capability range of the image stabilization mechanism.

According to a second aspect, the present disclosure relates to a method for controlling a stabilization mechanism for a camera comprising: detecting a motion of the camera by means of a motion sensor, forwarding information of the motion to a processor of the camera, controlling, using the processor, an actuator to move an element in an optical path so as to counteract the motion of the camera, controlling, using the processor, the actuator to move the element in the optical path along a secondary motion path, wherein the element is suspended by a ball and plate suspension such as the one disclosed in connection to the image stabilization mechanism.

Similar to embodiments of the inventive mechanism the method may in one or more embodiments thereof arranged to induce and control a secondary motion path being continuous motion path, an intermittent motion path, or a combination of thereof.

In one or more embodiments the element may be moved along the secondary motion path with a speed limited such that the effect on an image sensor of the camera is limited to fractions of a pixel per frame.

In other or combined embodiments a movement of the camera may be used as input for the secondary motion path.

In still further embodiments a heat map of the motion of the ball may be used as an input for the secondary motion path.

According to still another concept, the present disclosure relates to a computer program product comprising a computer-readable storage medium with instructions adapted to carry out the method according to the previous or following description when executed by a processor.

DETAILED DESCRIPTION

Figure 1:
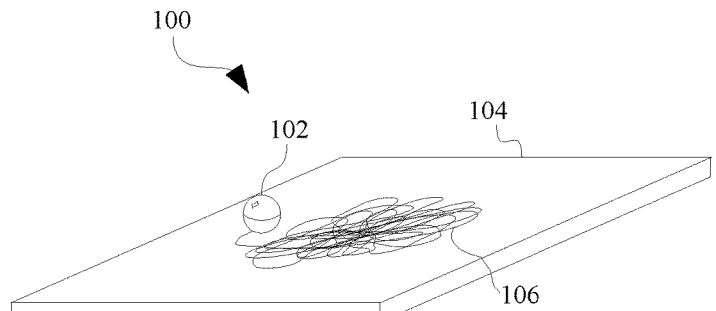
FIG. 1 is a schematical perspective view of a portion of a ball and plate arrangement used in one or more embodiments.

FIG. 1 is schematical perspective view of a portion of a mechanism according to a first embodiment of the present disclosure. The mechanism comprises a ball 102 and a plate 104 and during use of the mechanism the ball will travel along a track 106 so as to compensate for detected motion of the camera. The mechanism itself will be associated with either an image sensor or a lens element and by shifting either of these it will be possible to affect the position of an image on the image sensor. In theory the mechanism could be associated with any component in the optical system capable of affecting the optical path, such as a mirror if there is a mirror arranged in the optical path, yet in practice either the image sensor or the lens assembly will be used.

Details of the ball/plate mechanism, its basic control or its suspension have been disclosed in prior art and will not be a main issue for the present disclosure. In summary, some sort of tilt sensor, e.g. an accelerometer or a gyroscope arrangement, or a combination of the two, may be used to detect motion of the camera. Using the present settings of the imaging system, such as lens parameters relating to zoom level and focal length, a processor may determine the resulting effect in motion of the image in the image plane (on the sensor) wherein a countermotion may be induced by moving the lens assembly or the image sensor (or any other component capable of affecting the beam path).

An actuator actually inducing the countermotion may e.g. be based on electromagnetism or piezo arrangements. One specific type of actuators that may be used are the so called voice coil actuators, yet other types of actuators may be used as well.

An arrangement for moving a lens or a sensor may comprise one or more ball/plate mechanisms. In a practical example a full arrangement is likely to have three support points or more, to provide a stable arrangement. Not all support points would need to be provided with an inventive mechanism.

Figure 2:
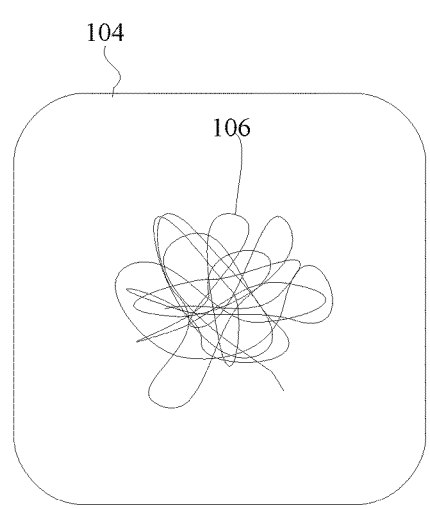
FIG. 2 is a schematical plan view of a portion of a ball and plate arrangement illustrating a prior art embodiment.

FIG. 2 is a schematic plan view illustrating a situation where the present disclosure is not applied. The ball (not shown) will move in relation to the plate 104 along a path 106 as illustrated by the full line, in order to stabilize the image. The path 106 is not based on a real situation, it is merely based on that the camera moves arbitrarily around a central point. In a situation where the camera is fully or partially supported by e.g. a fixture or a tripod the pattern may be completely different. One effect could be that the camera will be more prone to move in one direction than in another direction. Nevertheless, from the simplified example it is apparent that there will be an excessive wear in the center of the plate 104, eventually resulting in poor performance and eventually failure of the mechanism. Only one plate is shown in FIG. 2 (or any of the figures for that matter), yet in a normal installation there are two plates, arranged in an opposed relationship on either side of the ball; one plate is arranged on the item to be moved and another one a base. A plate may not form an isolated structure, it may simply be a planar portion of another structure. It should also be clarified that the ball in deed could be suspended in another way, e.g. in a socket, in one of the structures, in which case only one plate or planar portion would be needed. A hall-sensor arrangement or another mechanism may be used in order to ensure that the plate or plates return to a desired starting point after each use.

Figure 3:
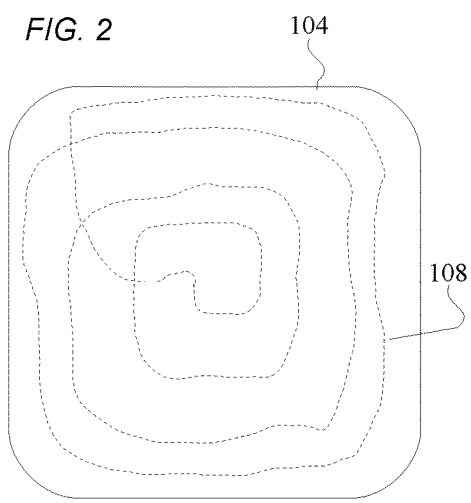
FIG. 3 is a plan view similar to FIG. 2, illustrating a first embodiment.

According to a first exemplifying embodiment of the disclosure, a secondary path of motion may be applied. This secondary path of motion is illustrated in FIG. 3, as a dashed line 108 on the plate 104. The effect of the stabilizing motion has not been considered in the view of FIG. 3. Now, in the embodiment of FIG. 3 the mechanism is arranged to move the ball around slowly over the surface of the plate. The word "slowly" is not a quantitative measure, yet there the situation is not of the type that only one single speed is possible, which will be discussed further. First a note on the effect of the secondary motion. The effect is readily appreciated by comparing (and possibly combining) the views of FIG. 2 and FIG. 3. By using the secondary motion of FIG. 3 the center of the motion illustrated in FIG. 2 will continuously move around on the plate, and this will reduce the wear of the plate, or at least distribute the wear over a larger surface area of the plate 104, thus effectively increasing its lifetime. The wear of the ball 102 will on a general level not be affected as much, yet by manufacturing the ball from a tougher material the combined lifetime of the entire mechanism may be prolonged. The secondary motion will also affect the position of the image in an image plane, and this will be discussed in reference to FIGS. 7 and 8, and since this is partly related to the definition of "slowly", or lack thereof, it will be discussed there as well. It may also be noted that the dashed line represents the position the ball would have if no stabilization motion was applied, a "stabilization midpoint" if you will. In a practical case, where stabilization motion may be applied continuously the actual path of the ball may not follow the dashed line at all. It would however cross it several times.

Figure 4:
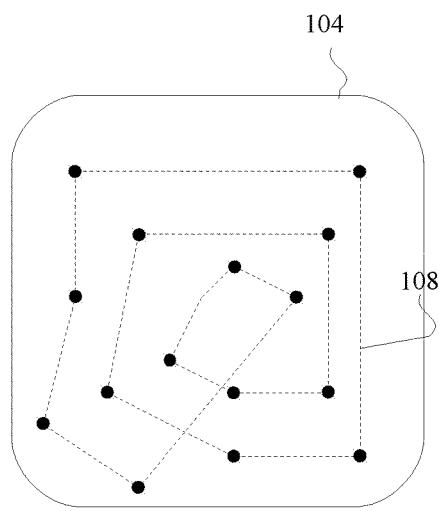
FIG. 4 is a plan view similar to FIG. 3, illustrating a second embodiment.

If the secondary motion in the embodiment of FIG. 3 is slow and optionally continuous, the motion of the embodiment illustrated in FIG. 4 is of an intermittent nature. In this embodiment the ball remains still (in terms of secondary motion) in one position for a while, after which it moves to a new position where it remains still for a while, and so on. This is illustrated in the connected dots of FIG. 4, where the dots correspond to positions where the ball is still (i.e. where there is no induced secondary motion). In each of these positions the ball may move around as illustrated in FIG. 2 so as to effect image stabilization, whereby wear distribution is accomplished.

In still further embodiments the secondary motion may be a combination of a continuous motion and an intermittent motion, effectively displaying a varying speed profile over time. The present disclosure as recited herein should not be limited in this respect, at least not in the broadest scope thereof.

Figure 5:
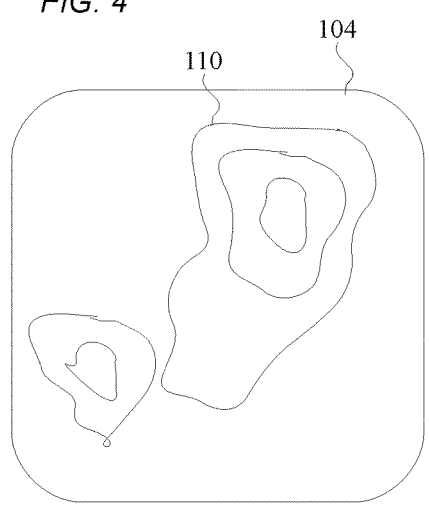
FIG. 5 is a plan view, similar to FIG. 4, illustrating a third embodiment.

In the embodiment illustrated by FIG. 5 statistics are used in order to control the secondary motion. The contour lines are meant to illustrate a heat map over the motion of the ball over time. The heat map does not have to separate the secondary motion from the image stabilizing motion, since it is the actual historical positions of the ball that is critical for the wear. Looking at the example of FIG. 5 it is evident that the ball has been located mainly in the upper right quadrant and in the lower left corner. This input may be used to control the secondary motion such that the ball is directed towards the lower right corner or the upper left corner so as to somewhat equalize the wear. Using the heatmap as input may be performed on many different levels of complexity, e.g. the heatmap (or a corresponding statistic measure) may be used continuously as input, or it may be used in temporally spaced isolated events in which a desired secondary path is calculated for the time up to the next event. In the present example the heatmap has been given the form of a contour map, since this is an illustrative and readily appreciable example. In practice the heat map may be represented by various statistical measures, and the present disclosure as defined by the claims should not be limited in this respect.

Figure 6:
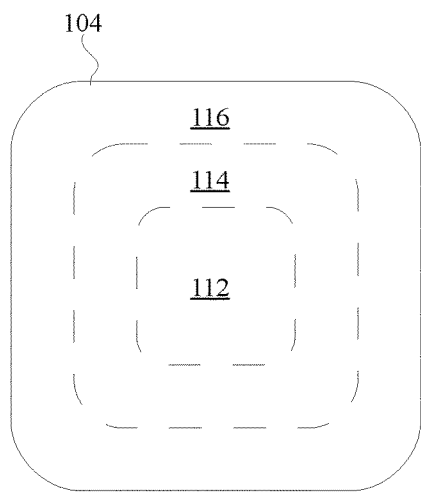
FIG. 6 is a plan view, similar to FIG. 5 of a fourth embodiment.

FIG. 6 illustrates a further embodiment including yet another control mechanism. Again, the plate 104 is shown, and in the present embodiment the surface of the plate has been divided into three functional concentrical segments; a center segment 112, an intermediate segment 114, and an outer segment 116. In a practical situation the surface area of the plate 104 will obviously be limited, which will limit a range of motion available for the ball 102. Another given parameter is that when the camera moves more, i.e. when the amplitude of the motion increases; the range of motion used for the ball increases as well. This may be used as valuable input for the control of the secondary motion. In essence as an increased amplitude of motion for the camera is detected by the accelerometer or gyroscope (or other suitable sensor) the secondary motion will be controlled so as to move the ball 102 towards the middle of the plate 104. In the embodiment of FIG. 6 the idea is that over a certain amplitude the ball 104 will be controlled to travel to and in the center segment 112, and below a certain amplitude the ball will be controlled to travel to and in the outer segment 116, and between these amplitudes the ball 104 may be controlled to travel to and in the intermediate segment 114. The phrase "to and in" does not mean that the ball is controlled to travel exclusively in these segment, the motion induced to stabilize the camera may still cause the ball to travel outside of the intended area.

The use of three segments in the present embodiment is based on ease of explanation only, there may be more segments, such as four, five, six, etc, fewer segments, such as two, or even no segments at all. An example of the latter may be that a working radius for the secondary motion is a continuous, inverse, function of the amplitude of motion of the camera. In the embodiments disclosed the amplitude of motion of the camera is used as input, yet an actual function may depend on more parameters, such as frequency, statistics of the camera motion over a shorter or extended period of time, etc.

In any of the embodiments disclosed in relation to FIGS. 5 and 6 a motion pattern as disclosed in relation to FIG. 3 or 4 may be applied. It may thus be a continuous motion, and intermittent motion, a varying speed motion, or a combination thereof.

In the following section a few examples of how the effects of the secondary motion may be cancelled will be described.

Figure 7:
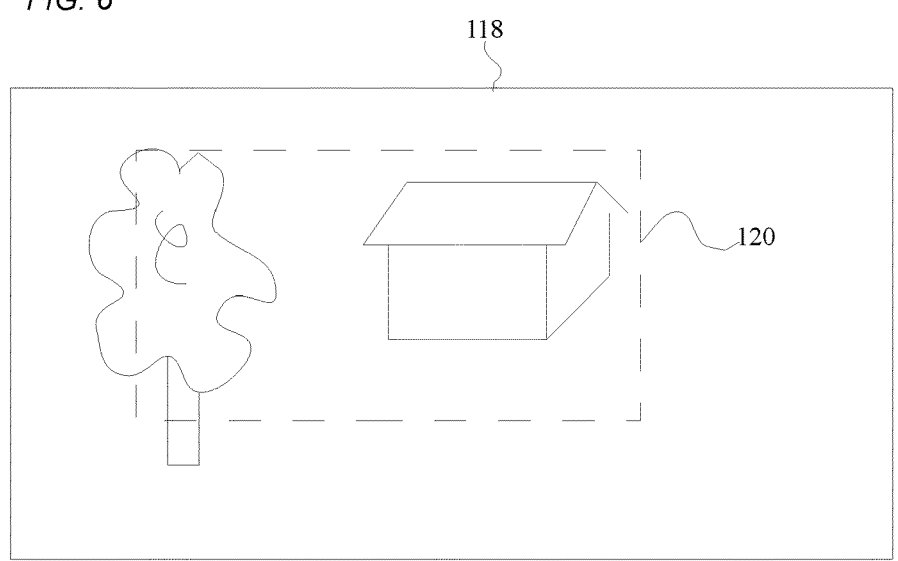
FIG. 7 illustrates the field of view of a camera.
Figure 8:
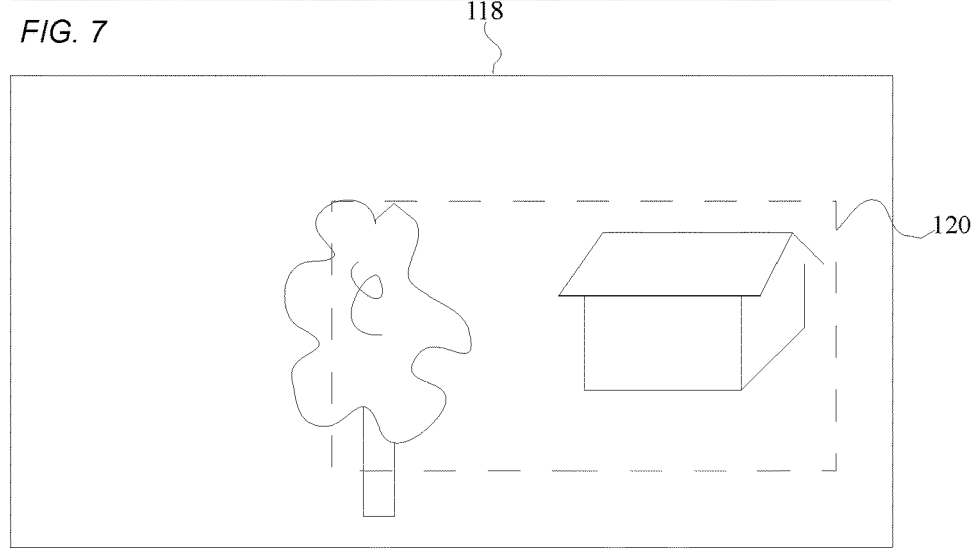
FIG. 8 is a view similar to that of FIG. 7 illustrating one effect of camera motion.

In FIG. 7 an image of a scene is exemplified. What is imaged onto the image sensor is defined by the outer rectangle 118, and what is shown on a display or at least forwarded in a video stream is defined by the inner dashed rectangle 120. In the present example the image sensor may be said to be oversized, yet the same effect may be accomplished by using the analogue to a digital zoom. In the view of FIG. 8 the secondary motion has caused the image imaged onto the image sensor to shift in location, but due to the fact that the sensor is oversized (or digital zoom is used) the same area as before may be shown to the user. The shift in location between FIG. 7 and FIG. 8 would in practice be hundreds of frames apart, so that the gradual image shift caused by the secondary motion would not be detected neither by the human eye nor by detection algorithms developed to e.g. detect motion.

The exact speed of motion for the secondary motion should preferably be such that it result in a shift of fractions of a pixel in an imaged view between adjacent image frames. Even if the speed is as low as to correspond to $1/100$ of a pixel per frame, common frame rates of 30-60 frames per second (fps) will result in that the secondary motion is noticeable from a wear-reducing perspective. This could be further exemplified: Consider that the speed is $1/100$ of a pixel per frame and that a 1080p sensor is used. One could assume that one could induce a secondary motion extending a maximum of 20% of the sensor, i.e. about 200 pixels. To move that distance would then require 20000 frames, which corresponds to about 10 minutes at 30 fps. A pattern or path of the type exemplified in FIG. 3 would then require about 30 minutes from start to finish (or from start to re-start).

The suggested speed for the secondary motion is deduced from a practical standpoint, and from that standpoint $1/10$ of a pixel per frame could be possible as well, and slower speeds as well. When slowing the motion there is no self-evident lower limit. When speeding up the motion eventually it may lead to artifacts in the image. These artifacts may be corrected for, e.g. by means of deconvolution, yet that and similar corrections may be demanding from a computational standpoint, which make them less suitable in an application where there is a live feed.

The secondary motion will in many embodiments move around the image on the image sensor and therefore a selection of an area of the sensor to be displayed to a user needs to be performed. The selection of the area shown to the user may be deduced from the controlled secondary motion, current settings of the lens system etc, i.e. it is predictable and may be calculated from various available input data.

An alternative or an addition to using a predictive method as in the above paragraph may be to use digital image stabilization, e.g. a digital image stabilization based on identification and localization of features in adjacent frames. Notably, existing digital image stabilization may be supported by input from various sensors, and consequently a combination of techniques may be used for reaching the desired end result.

An added benefit of the present disclosure, in all of its embodiments, is that it does not require any complex technology, at least not if considered in the light of the technique available in the relevant area of technology. Basically any drive unit as used for optical image stabilization today may be used, and the techniques for monitoring the position of the ball exists as well. For the inventive purpose it is the position of the ball that is interesting, yet this information may be deduced by monitoring the position or motion of the plate or plates with which the ball interact.

Furthermore, optical image stabilization may not be able to eliminate the effect of all types of shakes or vibration. In a generalized example it may be said that the optical image stabilization may be used to account for stabilization of movements within a first frequency interval (which may be open at one end or more and which may comprise several interval segments), while digital image stabilization may be used to account for stabilization of movements within a second frequency interval (which may be open at one end or more and which may comprise several interval segments). The first and second frequency interval may be partly overlapping. Digital image stabilization could account for correction at higher frequencies where wither the gyro or the stabilization mechanism are too slow to respond, while the optical image stabilization accounts for correction at lower frequencies, or the other way around.

Returning to the embodiment described referring to FIG. 6, where the secondary motion was partly controlled by the detected movement of the camera, the recently described proposed solution to the removal of visual effects caused by the secondary motion may be used in a situation of unwanted movement of the camera. In one embodiment therefore the processor is arranged to, if an unwanted movement of the camera is detected, optically zoom out, thus enlarging the field of view as imaged on the image sensor (corresponding to the area 118 in FIGS. 7 and 8. This will effectively increase how much the camera will be able to move before starting to affect the area shown to a user. As a result of the zoom out the processor would also have to rescale the view shown to a user, with the aim of hiding the effects of the zoom out procedure. This procedure will increase a stabilization capability range of the mechanism, or actually of the camera comprising the mechanism.

The use of optically zooming out and zooming in can also be used to minimize the amount of pixels thrown away because of the difference in size between 118 and 120. When the secondary motion path is in the middle of the plate, the optical zoom can be set to make 118 and 120 of equal size. The further away from the center of the plate the secondary motion moves, the more the camera has to optically zoom out in order for all of 120 to be included in 118. The images of 120 might then be scaled to a common size in order to fit a continuous image stream.

In the same or related embodiments the zoom level may be dynamically varied based on a displacement of the ball (in its stabilizing movement), the amount of compensation needed can be minimized. In the case of cropping, this means higher resolution when the ball is closer to the center of the plate.

Figure 9:
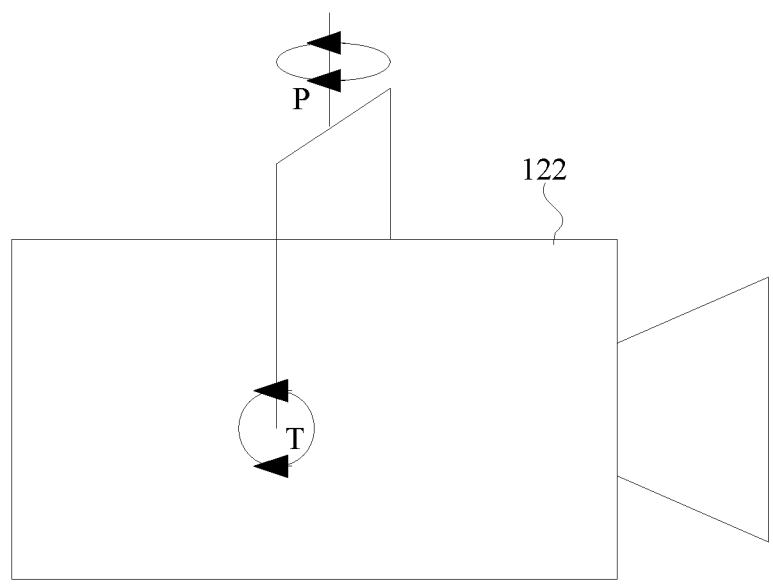
FIG. 9 is a schematic view of a camera and a camera suspension.

FIG. 9 exemplifies an embodiment where the elimination of the effect of the secondary motion is made using hardware. FIG. 9 shows a camera 122 schematically suspended such that it is able to pan and tilt. The processor may be used to control the panning mechanism and the tilting mechanism such that the effect of the secondary motion is eliminated by a countermotion in the pan P and tilt T direction. The effects considered are the effects on the positioning of the image on the image chip rather than the effects of wear reduction, obviously.

The embodiments of FIGS. 7, 8, and 9 may be combined freely, if considered appropriate. As one example of this the use of pan and tilt motors may be supported by digital image stabilization to reduce any residual effects.

What is claimed is:

1. An image stabilization mechanism for a camera, the mechanism comprising:
   a movement sensor capable of sensing motion of the camera;
   an element in an optical path of the camera;
   a ball and a plate acting as a bearing allowing for the element to move in a plane orthogonal to the optical path;
   an actuator mechanism capable of moving the element in the plane; and
   a processor configured to control the actuator to move the element as a response to motion of the camera as detected by the movement sensor, thereby stabilizing images from the camera;
   wherein the processor is further configured to move the element along a secondary motion path so as to distribute wear on the plate created by the ball;
   wherein the processor is capable of compensating for an image shift created by the secondary motion path by other means for shifting the image.

2. The image stabilization mechanism according to claim 1, wherein the element in the optical path comprises a lens or an image sensor.

3. The image stabilization mechanism of claim 1, wherein the secondary motion path is a continuous motion path, an intermittent motion path, or a combination of thereof.

4. The image stabilization mechanism of claim 1, wherein a speed of motion of the motion along the secondary motion path is limited so as to result in a shift in a field of view of the camera smaller than a fraction of a pixel of an image sensor per frame.

5. The image stabilization mechanism of claim 1, wherein the processor is configured to use a current motion of the camera as input for the secondary motion path.

6. The image stabilization mechanism of claim 1, wherein the processor is configured to use a heat map of a motion of the ball as an input for the secondary motion path.

7. The image stabilization mechanism of claim 1, wherein the other means for shifting the image comprises digital cropping and scaling.

8. The image stabilization mechanism of claim 1, wherein the other means for shifting the image comprises moving a pan and tilt mechanism of the camera.

9. The image stabilization mechanism of claim 1, wherein the processor is arranged to use optical zooming, scaling and cropping to increase a stabilization capability range of the image stabilization mechanism.

10. A method for controlling an image stabilization mechanism for a camera, the method comprising:

detecting a motion of the camera by means of a motion sensor;

forwarding information of the motion to a processor of the camera;

controlling, using the processor, an actuator to move an element in a plane orthogonal to an optical path of the camera so as to counteract the motion of the camera, wherein the element is suspended by a ball and plate acting as a bearing allowing for the element to move in the plane;

controlling, using the processor, the actuator to move the element as a response to motion of the camera as detected by the motion sensor, thereby stabilizing images from the camera, and move the element in the optical path along a secondary motion path so as to distribute wear on the plate created by the ball; and compensating, using the processor, for an image shift created by the secondary motion path by other means for shifting the image.

11. The method of claim 10, wherein the secondary motion path is continuous motion pattern, an intermittent motion pattern, or a combination of thereof.

12. The method of claim 10, further comprising moving the element along the secondary motion path with a speed limited such that an effect on an image sensor of the camera is limited to fractions of a pixel per frame.

13. The method of claim 10, further comprising using a movement of the camera as input for the secondary motion path.

14. The method of claim 10, further comprising using a heat map of a motion of the ball as an input for the secondary motion path.

15. A computer program product comprising a non-transitory computer-readable storage medium with instructions configured for execution by one or more processors to control an image stabilization mechanism for a camera, the instructions comprising:

detecting a motion of the camera by means of a motion sensor;

forwarding information of the motion to a processor of the camera;

controlling, using the processor, an actuator to move an element in a plane orthogonal to an optical path of the camera so as to counteract the motion of the camera, wherein the element is suspended by a ball and plate acting as a bearing allowing for the element to move in the plane;

controlling, using the processor, the actuator to move the element as a response to motion of the camera as detected by the motion sensor, thereby stabilizing images from the camera, and move the element in the optical path along a secondary motion path so as to distribute wear on the plate created by the ball; and compensating, using the processor, for an image shift created by the secondary motion path by other means for shifting the image.

* * * * *